(12) United States Patent
Kwon et al.

(10) Patent No.: US 9,786,874 B2
(45) Date of Patent: Oct. 10, 2017

(54) ELECTRODE HAVING ROUND CORNER

(71) Applicant: LG Chem, Ltd., Seoul (KR)

(72) Inventors: Sungjin Kwon, Daejeon (KR); Ki Woong Kim, Daejeon (KR); Dong-Myung Kim, Daejeon (KR)

(73) Assignee: LG Chem, Ltd. (KR)

( * ) Notice: Subject to any disclaimer, the term of this patent is extended or adjusted under 35 U.S.C. 154(b) by 751 days.

(21) Appl. No.: 13/845,482

(22) Filed: Mar. 18, 2013

(65) Prior Publication Data

US 2014/0255755 A1 Sep. 11, 2014

Related U.S. Application Data

(63) Continuation of application No. PCT/KR2013/002123, filed on Mar. 15, 2013.

(60) Provisional application No. 61/775,023, filed on Mar. 8, 2013.

(51) Int. Cl.
| | |
|---|---|
| *H01M 4/02* | (2006.01) |
| *H01M 2/02* | (2006.01) |
| *H01M 10/0585* | (2010.01) |
| *H01M 10/0587* | (2010.01) |
| *H01M 4/13* | (2010.01) |
| *H01M 10/052* | (2010.01) |

(52) U.S. Cl.
CPC ......... *H01M 2/0212* (2013.01); *H01M 2/024* (2013.01); *H01M 2/0217* (2013.01); *H01M 10/0585* (2013.01); *H01M 10/0587* (2013.01); *H01M 4/13* (2013.01); *H01M 10/052* (2013.01)

(58) Field of Classification Search
CPC combination set(s) only.
See application file for complete search history.

(56) References Cited

U.S. PATENT DOCUMENTS

| | | |
|---|---|---|
| 2,702,310 A | 2/1955 | Kaye et al. |
| 3,442,717 A | 5/1969 | Horn et al. |
| 4,092,464 A | 5/1978 | Dey et al. |
| 4,964,877 A | 10/1990 | Keister et al. |
| 5,582,931 A | 12/1996 | Kawakami |

(Continued)

FOREIGN PATENT DOCUMENTS

| | | |
|---|---|---|
| CN | 1314008 A | 9/2001 |
| CN | 1363121 A | 8/2002 |

(Continued)

OTHER PUBLICATIONS

Chinese Office Action for Application No. 201380002792.X dated Apr. 3, 2015.

(Continued)

*Primary Examiner* — Osei Amponsah
(74) *Attorney, Agent, or Firm* — Lerner, David, Littenberg, Krumholz & Mentlik, LLP (57) ABSTRACT

Disclosed herein is an electrode assembly including two or more unit cells, each of which includes a cathode, an anode, and a separator disposed between the cathode and the anode, electrode tabs protruding from the respective electrodes, wherein the unit cells are stacked in a height direction on the basis of a plane, at least two of the unit cells having different planer sizes, and one or more corners of each of the unit cells, which do not tangent to one side of each of the unit cells at which the electrode tabs are formed, are round.

17 Claims, 5 Drawing Sheets

(56) References Cited

U.S. PATENT DOCUMENTS

| | | |
|---|---|---|
| 5,633,097 A | 5/1997 | Miller |
| 5,652,074 A | 7/1997 | Larson, III et al. |
| 6,040,078 A | 3/2000 | Fauteux et al. |
| 6,224,995 B1 | 5/2001 | Fauteux et al. |
| 6,300,002 B1 | 10/2001 | Webb et al. |
| 6,423,449 B1 | 7/2002 | Hong |
| 6,498,951 B1 | 12/2002 | Larson et al. |
| 6,610,443 B2 | 8/2003 | Paulot et al. |
| 6,946,220 B2 | 9/2005 | Probst et al. |
| 7,285,334 B1 | 10/2007 | Yamashita et al. |
| 7,479,349 B2 | 1/2009 | O'Phelan et al. |
| 7,595,132 B2 | 9/2009 | Kang et al. |
| 9,246,185 B2 | 1/2016 | Kretschmar et al. |
| 2001/0005561 A1 | 6/2001 | Yamada et al. |
| 2002/0119367 A1 | 8/2002 | Watanabe et al. |
| 2002/0122975 A1 | 9/2002 | Spillman et al. |
| 2002/0160257 A1 | 10/2002 | Lee et al. |
| 2003/0013012 A1 | 1/2003 | Ahn et al. |
| 2003/0039883 A1 | 2/2003 | Notten et al. |
| 2003/0077509 A1 | 4/2003 | Probst et al. |
| 2004/0119442 A1 | 6/2004 | Lee et al. |
| 2005/0164094 A1 | 7/2005 | Kotato et al. |
| 2005/0214642 A1 | 9/2005 | Kim et al. |
| 2006/0172185 A1 | 8/2006 | Mimura |
| 2006/0269842 A1 | 11/2006 | Ichinose et al. |
| 2006/0275661 A1 | 12/2006 | Kim et al. |
| 2006/0286456 A1 | 12/2006 | Fu et al. |
| 2007/0054180 A1 | 3/2007 | Miyajima et al. |
| 2007/0059595 A1 | 3/2007 | Endo et al. |
| 2007/0099078 A1 | 5/2007 | Zhang et al. |
| 2007/0202401 A1 | 8/2007 | Viavattine |
| 2007/0218355 A1 | 9/2007 | Ryu et al. |
| 2007/0287064 A1 | 12/2007 | Suzuki et al. |
| 2008/0137890 A1 | 6/2008 | Petersen et al. |
| 2009/0023057 A1 | 1/2009 | Kim |
| 2009/0075168 A1 | 3/2009 | Lee |
| 2009/0123829 A1 | 5/2009 | Kim et al. |
| 2009/0159582 A1 | 6/2009 | Chami et al. |
| 2010/0047685 A1 | 2/2010 | Lee et al. |
| 2010/0112451 A1 | 5/2010 | Shibutani et al. |
| 2010/0279161 A1 | 11/2010 | Kang et al. |
| 2010/0319187 A1 | 12/2010 | Kim et al. |
| 2011/0052952 A1 | 3/2011 | Roh et al. |
| 2011/0064991 A1 | 3/2011 | Ahn |
| 2011/0183183 A1 | 7/2011 | Grady et al. |
| 2011/0274955 A1 | 11/2011 | Park et al. |
| 2011/0287308 A1 | 11/2011 | Kim et al. |
| 2012/0015223 A1 | 1/2012 | Bhardwaj et al. |
| 2012/0015236 A1 | 1/2012 | Spare |
| 2012/0107654 A1 | 5/2012 | Bhardwaj et al. |
| 2012/0129037 A1 | 5/2012 | Hohenthanner et al. |
| 2012/0135299 A1 | 5/2012 | Kwon et al. |
| 2012/0156551 A1 | 6/2012 | Cho |
| 2012/0183825 A1 | 7/2012 | Lee et al. |
| 2012/0202105 A1 | 8/2012 | Shinyashiki et al. |
| 2012/0225345 A1 | 9/2012 | Kim |
| 2013/0019732 A1 | 1/2013 | Yotsumoto |
| 2013/0108906 A1 | 5/2013 | Bhardwaj et al. |
| 2013/0144167 A1 | 6/2013 | Lee et al. |
| 2013/0344360 A1 | 12/2013 | Miyajama et al. |
| 2014/0011071 A1* | 1/2014 | Suzuki ............... H01M 2/0237 429/153 |
| 2014/0093762 A1 | 4/2014 | Goh et al. |

FOREIGN PATENT DOCUMENTS

| | | |
|---|---|---|
| CN | 1799162 A | 7/2006 |
| CN | 101107736 A | 1/2008 |
| EP | 1309018 A2 | 5/2003 |
| EP | 1326680 A1 | 7/2003 |
| EP | 1416571 A1 | 5/2004 |
| JP | 02-056856 | 2/1990 |
| JP | 05-234598 | 9/1993 |
| JP | 06-260209 | 9/1994 |
| JP | 08-171930 | 7/1996 |
| JP | 09-063591 | 3/1997 |
| JP | 09-082361 | 3/1997 |
| JP | H10188938 A | 7/1998 |
| JP | 10-270014 | 10/1998 |
| JP | H10296879 A | 11/1998 |
| JP | 2000133317 A | 5/2000 |
| JP | 2001028275 A | 1/2001 |
| JP | 2001068155 A | 3/2001 |
| JP | 2001167743 A | 6/2001 |
| JP | 2001357892 | 12/2001 |
| JP | 2002199910 A | 7/2002 |
| JP | 2002252023 A | 9/2002 |
| JP | 2002260600 A | 9/2002 |
| JP | 2002-343350 A | 11/2002 |
| JP | 2003217601 A | 7/2003 |
| JP | 2003523060 A1 | 7/2003 |
| JP | 2003-234094 * | 8/2003 ............. H01M 2/02 |
| JP | 2003234094 A | 8/2003 |
| JP | 2003303622 A | 10/2003 |
| JP | 2004111219 A | 4/2004 |
| JP | 3611765 B2 | 1/2005 |
| JP | 2005169728 A | 6/2005 |
| JP | 3680797 B2 | 8/2005 |
| JP | 2006127882 A | 5/2006 |
| JP | 2006134604 A | 5/2006 |
| JP | 2006236994 A | 9/2006 |
| JP | 2006-278331 A | 10/2006 |
| JP | 2007073207 A | 3/2007 |
| JP | 2008021634 A | 1/2008 |
| JP | 2008300141 A | 12/2008 |
| JP | 2009-218105 A | 9/2009 |
| JP | 2010176980 A | 8/2010 |
| JP | 2011003518 A | 1/2011 |
| JP | 2011081931 A | 4/2011 |
| JP | 2011517831 A | 6/2011 |
| JP | 2011204613 A | 10/2011 |
| KR | 2020000005813 U | 4/2000 |
| KR | 20-0207948 | 1/2001 |
| KR | 1020010055968 A | 7/2001 |
| KR | 20010104150 A | 11/2001 |
| KR | 10 2003-006690 * | 8/2003 ............. H01M 10/12 |
| KR | 1020030066960 A | 8/2003 |
| KR | 20040054113 A | 6/2004 |
| KR | 20050020357 A | 3/2005 |
| KR | 20050036466 A | 4/2005 |
| KR | 20060027281 A | 3/2006 |
| KR | 100670492 B1 | 1/2007 |
| KR | 20070066401 A | 6/2007 |
| KR | 1020070075941 A | 7/2007 |
| KR | 10 2007-0099068 * | 10/2007 ............. H01M 2/10 |
| KR | 1020070099068 A | 10/2007 |
| KR | 20080022915 A | 3/2008 |
| KR | 100829553 B1 | 5/2008 |
| KR | 20080058772 A | 6/2008 |
| KR | 20080095967 A | 10/2008 |
| KR | 10-0866767 B1 | 11/2008 |
| KR | 20090003823 A | 1/2009 |
| KR | 10-0884945 B1 | 2/2009 |
| KR | 20090028243 A | 3/2009 |
| KR | 20090062409 A | 6/2009 |
| KR | 20090097731 A | 9/2009 |
| KR | 100987300 B1 | 10/2010 |
| KR | 20100137290 A | 12/2010 |
| KR | 20110025023 A | 3/2011 |
| KR | 20110105737 A | 9/2011 |
| KR | 20110112241 A | 10/2011 |
| KR | 20110128594 A | 11/2011 |
| KR | 20120060706 A | 6/2012 |
| KR | 20120082808 A | 7/2012 |
| WO | 0072392 A1 | 11/2000 |
| WO | 0243178 A1 | 5/2002 |
| WO | 2012-009423 A1 | 1/2012 |
| WO | 2012053772 A2 | 4/2012 |
| WO | 2013054593 A1 | 4/2013 |
| WO | 2013141279 A1 | 9/2013 |
| WO | 2013-180378 A1 | 12/2013 |

(56) References Cited

OTHER PUBLICATIONS

Machine translation of KR 2003-0066960 (Jang).
Inernational Search Report for Application No. PCT/KR2013/001815 dated Jun. 27, 2013.
International Search Report for Application No. PCT/KR2013/002118 dated Jun. 28, 2013.
International Search Report for Application No. PCT/KR2013/002127 dated Jun. 27, 2013.
Extended Search Report from European Application No. 13797719.5, dated Feb. 12, 2016.
International Search Report from PCT/KR2013/002123, dated Dec. 11, 2013.

* cited by examiner

ELECTRODE HAVING ROUND CORNER

CROSS REFERENCE TO RELATED APPLICATIONS

The present application is a continuation of International Application No. PCT/KR2013/002123 filed Mar. 15, 2013, which claims the benefit of the filing date of U.S. Provisional Patent Application No. 61/775,023 filed on Mar. 8, 2013, the disclosures of which are hereby incorporated herein by reference.

TECHNICAL FIELD

The present invention relates to an electrode assembly including two or more unit cells, each of which includes a cathode, an anode, and a separator disposed between the cathode and the anode, electrode tabs protruding from the respective electrodes, wherein the unit cells are stacked in a height direction on the basis of a plane, at least two of the unit cells having different planer sizes, and one or more corners of each of the unit cells, which do not tangent to one side of each of the unit cells at which the electrode tabs are formed, are round.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as mobile devices.

Based on the appearance thereof, a lithium secondary battery may be classified as a cylindrical battery, a prismatic battery or a pouch-shaped battery. Based on the kind of an electrolyte, a lithium secondary battery may also be classified as a lithium-ion battery, a lithium-ion polymer battery or a lithium polymer battery.

A recent trend in the miniaturization of mobile devices has increased the demand for a prismatic battery or a pouch-shaped battery, which has a small thickness. In particular, much interest is currently focused on such a pouch-shaped battery because it is easy to modify the shape of the pouch-shaped battery, the manufacturing cost of the pouch-shaped battery is low, and the pouch-shaped battery is lightweight.

Generally, a pouch-shaped battery is a battery having an electrode assembly and an electrolyte in a pouch-shaped battery case, formed of a laminate sheet including a resin layer and a metal layer, in a sealed state. The electrode assembly mounted in the battery case is configured in a jelly-roll (wound) type structure, a stacked type structure or a combination (stacked/folded) type structure.

Figure 1:
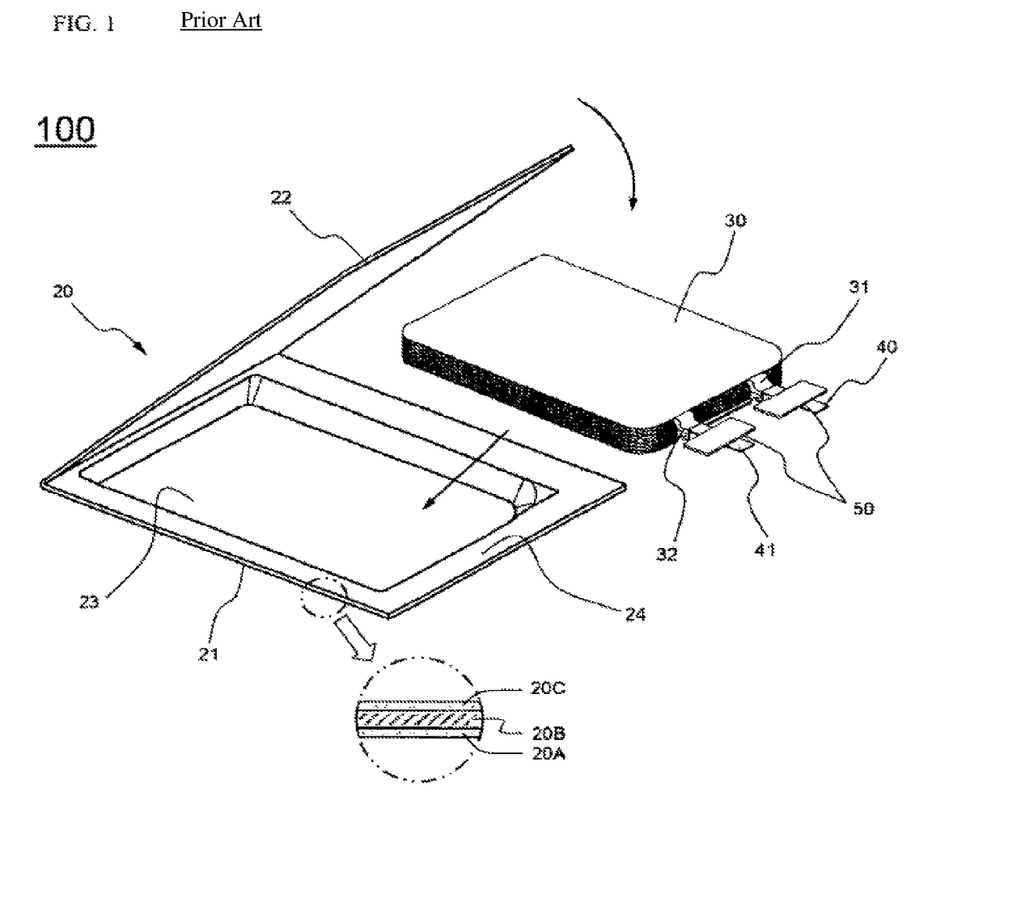
FIG. 1 is a perspective view showing a conventional battery cell.

FIG. 1 is a view typically showing the structure of a pouch-shaped secondary battery including a stacked type electrode assembly.

Referring to FIG. 1, a pouch-shaped secondary battery 10 is configured to have a structure in which an electrode assembly 30, including cathodes, anodes, and separators, coated with a solid electrolyte, disposed respectively between the cathodes and the anodes, is mounted in a pouch-shaped battery case 20 in a sealed state such that two electrode leads 40 and 41 electrically connected to cathode tabs 31 and anode tabs 32 of the electrode assembly 30 are exposed to the outside.

The battery case 20 includes a case body 21 having a depressed receiving part 23, in which the electrode assembly 30 is located, and a cover 22 integrally connected to the case body 21.

The battery case 20 is formed of a laminate sheet including an outer resin layer 20A constituting the outermost portion of the laminate sheet, an isolation metal layer 20B to prevent penetration of materials, and an inner resin layer 20C for sealing.

The cathode tabs 31 and the anode tabs 32 of the stacked type electrode assembly 30 are respectively coupled to the electrode leads 40 and 41 by welding. In addition, insulative films 50 are attached to the top and bottom of each of the electrode leads 40 and 41 to prevent the occurrence of a short circuit between a thermal welding device (not shown) and the electrode leads 40 and 41 and to achieve sealing between the electrode leads 40 and 41 and the battery case 20 when the upper end 24 of the case body 21 and the upper end of the cover 22 are thermally welded to each other using the thermal welding device.

In recent years, however, a new type of battery cell is required in accordance with a slim type design trend or various other design trends.

In addition, the above-mentioned battery cells are configured to include electrode assemblies having the same size or the same capacity. For this reason, in order to manufacture a battery cell having a novel structure in consideration of the design of a device, to which the battery cell is applied, it is necessary to reduce the capacity of the battery cell or modify the design of the device so that the size of the device is increased.

In addition, electrical connection is complicated during modification of the design of the device, and therefore, it is difficult to manufacture a battery cell satisfying desired conditions.

Furthermore, it is also necessary to manufacture the battery case based on the shape of the electrode assembly.

Therefore, there is a high necessity for an electrode assembly and a battery case that can be used depending upon the shape of a device, to which a battery cell is applied, and a battery cell including the same.

DISCLOSURE

Technical Problem

Therefore, the present invention has been made to solve the above problems, and other technical problems that have yet to be resolved.

Specifically, it is an object of the present invention to provide an electrode assembly configured to have a structure in which the electrode assembly can be mounted in various spaces of a device, thereby maximizing utilization of the inner space of the device and also configured to have a structure in which the electrode assembly can be efficiently mounted in devices having various external appearances in addition to a rectangular external appearance.

Technical Solution

In accordance with one aspect of the present invention, the above and other objects can be accomplished by the provision of an electrode assembly including two or more unit cells, each of which includes a cathode, an anode, and a separator disposed between the cathode and the anode, electrode tabs protruding from the respective electrodes, wherein the unit cells are stacked in a height direction on the basis of a plane, at least two of the unit cells having different planer sizes, and one or more corners of each of the unit cells, which do not tangent to one side of each of the unit cells at which the electrode tabs are formed, are round.

The electrode assembly according to the present invention, formed by stacking unit cells having different sizes, includes round corners. Consequently, it is possible for the electrode assembly according to the present invention to more accurately correspond to shapes, including a curved shape, of a device in which a battery cell including the electrode assembly is mounted and thus to further decrease the size of the device.

The number of unit cells having different planar sizes included in the electrode assembly may be flexibly adjusted based on the shape or required capacity of a device in which the battery cell is installed. Specifically, the electrode assembly may include two or three unit cells. Alternatively, the electrode assembly may include four or more unit cells.

In a concrete example, the maximum value of the radius of curvature of each of the round corners may be equivalent to 50% the length of each of the unit cells. The length of each of the unit cells may be the size of one side of each of the unit cells in the direction in which the electrode tabs protrude from each of the unit cells. In addition, the width of each of the unit cells, which will hereinafter be described, may be the size of one side of each of the unit cells in the direction perpendicular to the direction in which the electrode tabs protrude from each of the unit cells.

If the radius of curvature of each of the round corners is greater than 50% the length of each of the unit cells, the electrode sheet may be broken during the manufacture of the electrode assembly. Generally, a unit cell is manufactured by (i) notching a portion of an electrode sheet to form electrode tabs and round corners at the electrode sheet, (ii) winding the notched electrode sheet, (iii) unwinding the electrode sheet, applying active materials, disposing a separator between the electrode sheet and another electrode sheet, and cutting the stack constituted by the separator and the electrode sheets. If the electrode sheet is deeply notched in the longitudinal direction of the electrode sheet to increase the radius of curvature of a round corner of the electrode sheet during the manufacture of the unit cell, stress may concentrate at the notched portions of the electrode sheet, which have relatively small areas, when the electrode sheet is wound with the result that the electrode sheet may be broken. In a case in which round corners are formed at the electrode sheet to manufacture electrode assemblies having various shapes, therefore, the radius of curvature of each of the round corners to prevent the electrode sheet from being broken during the manufacture of the electrode assemblies may be equivalent to maximum 50% the length of each of the unit cells. Specifically, the radius of curvature of each of the round corners may be equivalent to 5 to 45% the length of each of the unit cells.

In a case in which the electrode assembly includes n unit cells, the size of an n-th unit cell located at the uppermost end of the electrode assembly may be equivalent to more than 1% and less than 100% that of an (n−1)-th unit cell adjacent to the n-th unit cell.

For example, in a case in which the electrode assembly includes three unit cells, the size of a third unit cell located at the uppermost end of the electrode assembly may be equivalent to about 75% that of a second unit cell under the third unit cell. In addition, the size of the second unit cell may be equivalent to about 75% that of a first unit cell located at the lowermost end of the electrode assembly. Consequently, the sizes of the third unit cell, the second unit cell, and the first unit cell are gradually increased.

Alternatively, in a case in which the electrode assembly includes two unit cells, the size of a second unit cell located at the upper end of the electrode assembly may be equivalent to more than 1% and less than 100% that of a first unit cell under the second unit cell. For example, the size of the second unit cell may be equivalent to about 75% that of the first unit cell.

The minimum difference between the width or the length of the n-th unit cell and the width or the length of the (n−1)-th unit cell may be 0.5 mm. The widths and the lengths of the unit cells are decided through notching and cutting steps. If the difference between the width or the length of the n-th unit cell and the width or the length of the (n−1)-th unit cell is less than 0.5 mm due to tolerances generated during the notching and cutting steps, it is not possible to manufacture unit cells having significantly different planar sizes. In order to manufacture unit cells having significantly different planar sizes, therefore, the minimum difference between the width or the length of the n-th unit cell and the width or the length of the (n−1)-th unit cell may be 0.5 mm, preferably 1 mm.

For example, in a case in which a third unit cell having a width of 100 mm and a second unit cell having a width of 103 mm are stacked to manufacture an electrode assembly including unit cells having different planar sizes based on a difference in width between the third unit cell and the second unit cell of 3 mm, the difference between the width of the third unit cell and the width of the second unit cell may be slight due to a tolerance generated during a cutting step with the result that an electrode assembly including the unit cells having substantially the same planar size may be manufactured. Consequently, the electrode assembly manufactured as described above may not be different in structure from a conventional electrode assembly having a uniform width and length.

In the same manner, in order to secure a significant difference between the radii of curvature of round corners of adjacent unit cells, the minimum difference between the radius of curvature of each round corner of the n-th unit cell and the radius of curvature of each round corner of the (n−1)-th unit cell may be 0.5 mm, specifically 1 mm.

In addition, the minimum difference between the width or the length of the first unit cell located at the lowermost end of the electrode assembly and the width or the length of the second unit cell adjacent to the first unit cell may be 2 mm. The electrode assembly according to the present invention is mounted in a battery case having the internal structure corresponding to the external structure of the electrode assembly in a sealed state to manufacture a battery cell. The battery case may be formed of a laminate sheet. The laminate sheet includes a resin layer and a metal layer. Generally, a short circuit may occur at the metal layer of the laminate sheet. For this reason, the end of the laminate sheet, from which the metal layer is exposed outward, is bent and disposed on the battery case in tight contact and an insulative tape is attached to the exposed metal layer to prevent the occurrence of a short circuit at the metal layer.

In a case in which the first unit cell located at the lowermost end of the electrode assembly and the second unit cell adjacent to the first unit cell have different sizes as in the electrode assembly according to the present invention, the insulative tape is attached to the outside of the battery case corresponding to a portion of the top of the first unit cell, i.e.

a portion of the first unit cell which does not overlap with the second unit cell. If the difference between the width or the length of the first unit cell and the width or the length of the second unit cell 2 is less than 2 mm, the area of the battery case to which the insulative tape is attached is decreased with the result that the insulative tape may not provide sufficient adhesive strength. Consequently, the insulative tape may be separated from the battery case, and therefore, a short circuit may occur due to the exposed metal layer of the laminate sheet.

In order to secure the adhesive strength of the insulative tape with respect to the first unit cell and thus to prevent the occurrence of short circuit due to the exposed metal layer of the laminate sheet, therefore, the electrode assembly according to the present invention may be configured such that the minimum difference between the width or the length of the first unit cell located at the lowermost end of the electrode assembly and the width or the length of the second unit cell is 2 mm, specifically 3 mm.

Similarly, in order to secure the adhesive strength of the insulative tape with respect to the first unit cell and thus to prevent the occurrence of short circuit due to the exposed metal layer of the laminate sheet, the minimum difference between the radius of curvature of each round corner of the first unit cell and the radius of curvature of each round corner of the second unit cell may be 2 mm, specifically 3 mm.

In a case in which the electrode assembly includes n unit cells, the minimum distance between each of the electrode tabs and a corresponding end of the n-th unit cell located at the uppermost end of the electrode assembly in the lateral direction may be 4 mm, specifically 4.4 mm.

The electrode sheet is notched to form the electrode tabs at the respective unit cells. In order to prevent the electrode tabs from being warped due to stress, wedge-shaped or arc-shaped grooves are further formed on a cutting line along which the unit cells are cut, i.e. at the upper ends of opposite sides of the unit cells, by notching. If distances between the electrode tabs and corresponding ends of each unit cell are too small when the grooves are formed by notching, interference between the electrode tabs and the grooves occurs with the result that the notching process may not be easily carried out. For this reason, the minimum distance between each of the electrode tabs and a corresponding end of the unit cell located at the uppermost end of the electrode assembly in the lateral direction may be 4 mm, specifically 4.4 mm.

Meanwhile, the electrode tabs of the first unit cell located at the lowermost end of the electrode assembly to the (n−1)-th unit cell adjacent to the n-th unit cell may be formed at the same positions in plane as the electrode tabs of the n-th unit cell. The unit cells have different planar sizes. If the electrode tabs are formed at the unit cells at the same intervals from opposite ends of the unit cells, therefore, it may be difficult to connect the electrode tabs of the unit cells such that the electrode tabs are connected to electrode leads. In order to easily achieve connection between the electrode tabs of the unit cells, therefore, the electrode tabs of the first unit cell to the (n−1)-th unit cell adjacent to the n-th unit cell may be formed at the same positions in plane as the electrode tabs of the n-th unit cell. For example, the electrode tabs of the first unit cell and the second unit cell may be formed at the same positions in plane as the electrode tabs of the third unit cell.

The minimum distance between the cathode tab and the anode tab may be 10 mm. In order to couple the electrode tabs to a charging and discharging apparatus during a charging process to manufacture the electrode assembly, the distance between the cathode tab and the anode tab may be 10 mm or more. The distance between the cathode tab and the anode tab may be adjusted according to the widths of the electrode tabs and the distance between each of the electrode tabs and a corresponding end of each unit cell.

In accordance with another aspect of the present invention, there is provided an electrode sheet having an electrode active material applied to one major surface or opposite major surfaces of a current collector sheet, the electrode sheet being cut to manufacture a plurality of unit cells, wherein first notch portions are formed at one side, selected from between an upper side and a lower side, of the electrode sheet such that the first notch portions are arranged at intervals corresponding to a width of each of the unit cells and second notch portions corresponding to the first notch portions are formed at the other side of the electrode sheet, and wherein an upper end cut side for a cutting margin is formed at each of the second notch portions, the upper end cut side being smaller in size than a lower end cut side.

That is, in the electrode sheet including the notch portions according to the present invention, the upper end cut side is formed at each of the second notch portions unlike conventional notch portions. Even when a cutting tolerance is generated, therefore, it is possible to manufacture a unit cell conforming with an initial design shape and having no protrusion by cutting the electrode sheet along the cutting line on the upper end cut side.

In an embodiment, each of the first notch portions may be configured to have a wedge-shaped or arc-shaped structure having a width decreased in the longitudinal direction of the electrode sheet.

Each of the second notch portions may have a larger area than each of the first notch portions. Each of the second notch portions may be larger than each of the first notch portions such that various structures may be formed at one corner of each of the unit cells.

The lower end cut side of each of the second notch portions may have a length equivalent to 10 to 80% the width of each of the unit cells. The length of the lower end cut side of each of the second notch portions may be adjusted based on a desired shape of each of the unit cells.

The upper end cut side of each of the second notch portions may have a length of 0.1 to 1 mm. If the length of the upper end cut side of each of the second notch portions is too small, the electrode sheet is not cut on the upper end cut side of each of the second notch portions when a cutting tolerance is generated with the result that a protrusion may be formed at each of the unit cells. If the length of the upper end cut side of each of the second notch portions is too large, on the other hand, a ratio in size of the upper end cut side to each of the unit cells is increased with the result that it may be necessary to further cut the upper end cut side of each of the second notch portions in order to manufacture an electrode assembly having a desired shape.

Specifically, when the upper end cut side of each of the second notch portions has a length of 0.2 to 0.8 mm, it is possible to prevent generation of a protrusion due to a cutting tolerance and thus to manufacture an electrode assembly having a desired shape without further cutting of the upper end cut side of each of the second notch portions.

In addition, the distance between the upper end cut side and the lower end cut side of each of the second notch portions may be equivalent to 30 to 150% a length of lower end cut side. The distance between the upper end cut side and the lower end cut side of each of the second notch portions may be adjusted based on a desired shape of each of the unit cells.

Opposite lateral cut sides of each of the second notch portions may be symmetrical. Alternatively, the opposite lateral cut sides of each of the second notch portions may be asymmetrical.

In a case in which the opposite lateral cut sides of each of the second notch portions are symmetrical, one corner and the other corner of each of the unit cells manufactured from the electrode sheet may also be symmetrical.

In a case in which the opposite lateral cut sides of each of the second notch portions are asymmetrical, on the other hand, one corner and the other corner of each of the unit cells manufactured from the electrode sheet may also be asymmetrical.

At least one lateral cut side of each of the second notch portions may be formed in an arc shape protruding toward each of the second notch portions. As a result, one corner of each of the unit cells may be rounded.

According to the present invention, each unit cell is formed by cutting the electrode sheet with the above-stated construction. At least one lateral cut side tangent to an upper side of the unit cell may be provided with an upper end cut side of a second notch portion based on a cutting margin. According to circumstances, a portion of the upper end cut side of the second notch portion based on the cutting margin may not be provided at opposite lateral cut sides of the unit cell.

In accordance with another aspect of the present invention, there is provided a battery cell including the electrode assembly with the above-stated construction, wherein the electrode assembly is mounted in a battery case in a sealed state such that the electrode assembly is impregnated with an electrolyte.

As previously described, the battery case may be formed of a laminate sheet comprising a resin layer and a metal layer. Alternatively, the battery case may be a metal container used in a prismatic battery.

The battery case formed of the laminate sheet or the metal container may be provided with a receiving part, in which the electrode assembly according to the present invention is mounted. The receiving part may have an internal structure corresponding to the shape of the electrode assembly according to the present invention.

The battery case may include a lower case having the receiving part and an upper case to cover the lower case such that the electrode assembly is sealed in the battery case. The upper case may be connected to one side of the lower case in the longitudinal direction of the lower case. Alternatively, the upper case may be connected to one side of the lower case in the lateral direction of the lower case. In a case in which the upper case is connected to one side of the lower case in the longitudinal direction of the lower case, the upper case may be folded in the lateral direction of the lower case in a state in which the electrode assembly is mounted in the receiving part such that that the electrode assembly is sealed in the battery case. On the other hand, in a case in which the upper case is connected to one side of the lower case in the lateral direction of the lower case, the upper case may be folded in the longitudinal direction of the lower case in a state in which the electrode assembly is mounted in the receiving part such that that the electrode assembly is sealed in the battery case.

The electrode tabs of the unit cells constituting the electrode assembly of the battery cell may be coupled to an electrode lead to form an electrode terminal. That is, even in a case in which a plurality of electrode tabs protrudes from unit cells having different electrode structures, the electrode tabs may be coupled to an electrode lead to form an electrode terminal of the battery cell.

The width of the electrode lead may be equivalent to 50 to 90% that of each of the electrode tabs. If the width of the electrode lead is greater than that of each of the electrode tabs, a portion of another electrode lead which is not coupled to the electrode tabs may come into contact with the electrode assembly when external impact is applied to the battery cell with the result that a short circuit may occur.

The battery cell may be a lithium ion battery cell or a lithium ion polymer battery cell; however, the present invention is not limited thereto.

In accordance with another aspect of the present invention, there is provided a device including the battery cell with the above-stated construction as a power source. The device may be selected from among a mobile phone, a portable computer, a smartphone, a tablet personal computer (PC), a smart pad, a netbook computer, a light electric vehicle (LEV), an electric vehicle, a hybrid electric vehicle, a plug-in hybrid electric vehicle, and a power storage device.

In accordance with a further aspect of the present invention, there is provided a battery pack including the battery cell with the above-stated construction as a unit battery, wherein the battery cell includes two or more battery cells. That is, there is provided a battery pack configured to have a structure in which two or more battery cells, as unit batteries, are connected in series and/or parallel to each other. The battery pack may be used in a device selected from among a mobile phone, a portable computer, a smartphone, a tablet PC, a smart pad, a netbook computer, an LEV, an electric vehicle, a hybrid electric vehicle, a plug-in hybrid electric vehicle, and a power storage device.

The structure of the device and a method of manufacturing the device are well known in the art to which the present invention pertains, and therefore, a detailed description thereof will be omitted.

Advantageous Effects

As is apparent from the above description, an electrode assembly according to the present invention, formed by stacking unit cells having different sizes, includes round corners. Consequently, it is possible for the electrode assembly according to the present invention to more accurately correspond to shapes, including a curved shape, of a device in which a battery cell including the electrode assembly is mounted and thus to further decrease the size of the device.

In addition, it is possible to prevent an electrode sheet from being broken and to prevent the occurrence of a short circuit through secure attachment of an insulative tape during the manufacture of electrode assemblies having various shapes.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 2:
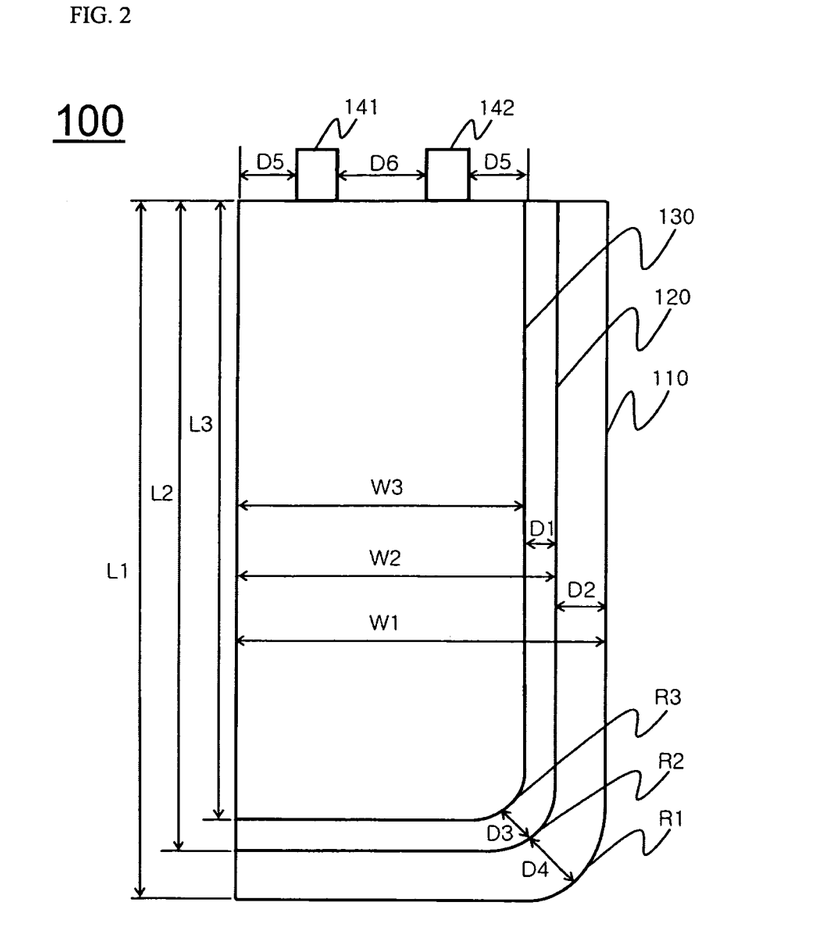
FIG. 2 is a plan view showing an electrode assembly according to an embodiment of the present invention.
Figure 3:
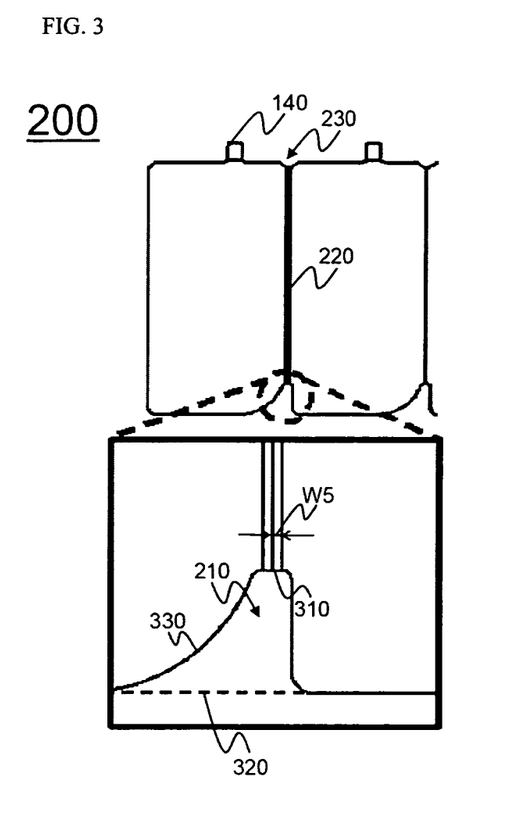
FIG. 3 is a plane view showing an electrode sheet notched to manufacture the electrode assembly of FIG. 2.

FIG. 2 is a plan view typically showing an electrode assembly according to an embodiment of the present invention and FIG. 3 is a plane view typically showing an electrode sheet notched to manufacture the electrode assembly according to the present invention.

Referring to FIGS. 2 and 3, an electrode assembly 100 includes a first unit cell 110, a second unit cell 120, a third unit cell 130, and electrode tabs 141 and 142. The second unit cell 120 is stacked on the upper end of the first unit cell 110. The third unit cell 130 is stacked on the upper end of the second unit cell 120. The second unit cell 120 has a smaller planar size than the first unit cell 110. The third unit cell 130 has a smaller planar size than the second unit cell 120. In addition, a radius R2 of curvature of a round corner of the second unit cell 120 is smaller than a radius R1 of curvature of a round corner of the first unit cell 110. A radius R3 of curvature of a round corner of the third unit cell 130 is smaller than the radius R2 of curvature of the round corner of the second unit cell 120.

The radii R1, R2, and R3 of curvature of the round corners of the respective unit cells 110, 120, and 130 are equivalent to about 15% lengths L1, L2, and L3 of the respective unit cells 110, 120, and 130. In order to form the round corners at the respective unit cells 110, 120, and 130, the lower end of an electrode sheet 200 is notched to form second notch portions 210. If the radii R1, R2, and R3 of curvature of the round corners of the respective unit cells 110, 120, and 130 are increased such that the radii R1, R2, and R3 of curvature of the round corners of the respective unit cells 110, 120, and 130 exceed 50% the length of the electrode sheet 200, i.e. the lengths L1, L2, and L3 of the respective unit cells 110, 120, and 130, to form large round corners, stress concentrates at cutting lines 20 of the electrode sheet 200 when the electrode sheet 200 is wound after the notching process is performed with the result that the electrode sheet 200 may be broken. For this reason, it is preferable to set the radii R1, R2, and R3 of curvature of the round corners of the respective unit cells 110, 120, and 130 such that the radii R1, R2, and R3 of curvature of the round corners of the respective unit cells 110, 120, and 130 are equivalent to 5 to 45% the lengths L1, L2, and L3 of the respective unit cells 110, 120, and 130.

The size of the second unit cell 120 is equivalent to about 75% that of the first unit cell 110 adjacent to the second unit cell 120. The size of the third unit cell 130 is equivalent to about 75% that of the second unit cell 120 adjacent to the third unit cell 130. Consequently, the sizes of the unit cells 110, 120, and 130 are gradually decreased from the first unit cell 110 to the third unit cell 130.

A difference D1 between a width W2 of the second unit cell 120 and a width W3 of the third unit cell 130 is set to have a minimum value. In a case in which an electrode assembly having a small difference in width between adjacent unit cells is manufactured, the difference in width between the unit cells is slight due to a tolerance generated during cutting with the result that it is possible to manufacture an electrode assembly configured such that the unit cells have a uniform width and length. Consequently, it is preferable to set the difference in width between the adjacent unit cells such that the difference in width between the adjacent unit cells is at least 1 mm.

Similarly, a difference D3 between the radius R2 of curvature of the round corner of the second unit cell 120 and the radius R3 of curvature of the round corner of the third unit cell 130 is set to have a minimum value equal to the minimum value of the difference D1 between the width W2 of the second unit cell 120 and the width W3 of the third unit cell 130.

In addition, a difference D2 between a width W1 of the first unit cell 110 and the width W2 of the second unit cell 120 is set to have a minimum value. In a case in which the difference D2 between the width W1 of the first unit cell 110 and the width W2 of the second unit cell 120 is too small, an area of a battery case to which an insulative tape is attached is decreased with the result that the insulative tape may not provide sufficient adhesive strength. Consequently, the insulative tape may be separated from the battery case. For this reason, it is preferable to set the difference D2 between the width W1 of the first unit cell 110 and the width W2 of the second unit cell 120 such that the difference D2 between the width W1 of the first unit cell 110 and the width W2 of the second unit cell 120 is at least 3 mm.

Similarly, a difference D4 between the radius R1 of curvature of the round corner of the first unit cell 110 and the radius R2 of curvature of the round corner of the second unit cell 120 is set to have a minimum value equal to the minimum value of the difference D2 between the width W1 of the first unit cell 110 and the width W2 of the second unit cell 120.

A distance D5 between the electrode tab 141 and one end of the third unit cell 130 or between the electrode tab 142 and the other end of the third unit cell 130 is at least 4.4 mm. If distances between electrode tabs 140 and corresponding ends of a unit cell are too small when the upper end of the electrode sheet 200 is notched to form a first notch portion 230 configured to have a groove shape, interference between the electrode tabs 140 and the first notch portion 230 occurs with the result that the notching process may not be easily carried out. For this reason, it is preferable to set the distance D5 between the electrode tab 141 and one end of the third unit cell 130 or between the electrode tab 142 and the other end of the third unit cell 130 such that the distance D5 between the electrode tab 141 and one end of the third unit cell 130 or between the electrode tab 142 and the other end of the third unit cell 130 is 4.4 mm.

In addition, electrode tabs of the first unit cell 110 and electrode tabs of the second unit cell 120 are formed at the same positions as the electrode tabs of the third unit cell 130.

A distance D6 between the cathode tab 141 and the anode tab 142 is 10 mm. In order to couple the electrode tabs 141 and 142 to a charging and discharging apparatus during a charging process to manufacture the electrode assembly 100, it is preferable to set the distance D6 between the cathode tab 141 and the anode tab 142 such that the distance D6 between the cathode tab 141 and the anode tab 142 is at least 10 mm. The distance D6 between the cathode tab 141 and the anode tab 142 may be adjusted according to the widths of the electrode tabs 141 and 142 and the distance D5 between the electrode tab 141 and one end of the third unit cell 130 or between the electrode tab 142 and the other end of the third unit cell 130.

Electrode tabs 140 and first notch portions 230 are formed at the upper side of an electrode sheet 200 such that the first notch portions 230 are arranged at intervals corresponding to the width of a unit cell. Second notch portions 210 are formed at the lower side of the electrode sheet 200 such that the second notch portions 210 are arranged at the intervals corresponding to the width of the unit cell.

An upper end cut side 310 for a cutting margin is formed at each of the second notch portions 210. The upper end cut side 310 is shorter than a lower end cut side 320.

In addition, a left side 330 of each of the second notch portions 210 is formed in an arc shape, by which the right lower end corner of the unit cell is rounded after the electrode sheet 200 is cut.

In a normal process, the electrode sheet 200 is cut along a cutting line 220 interconnecting the middle point of each of the first notch portions 230 and the middle point of the upper end cut side 310 of each of the second notch portions 210. If a cutting tolerance is generated, however, the electrode sheet 200 is cut at a position deviating from the cutting line 200 by a predetermined width W5.

The unit cell manufactured with the cutting tolerance may be slightly different from a unit cell based on an initially designed standard. However, one corner of the unit cell is rounded, which conforms to a design concept of the unit cell. Consequently, the unit cell may be used as an element necessary to manufacture an electrode assembly without an additional process.

Figure 4:
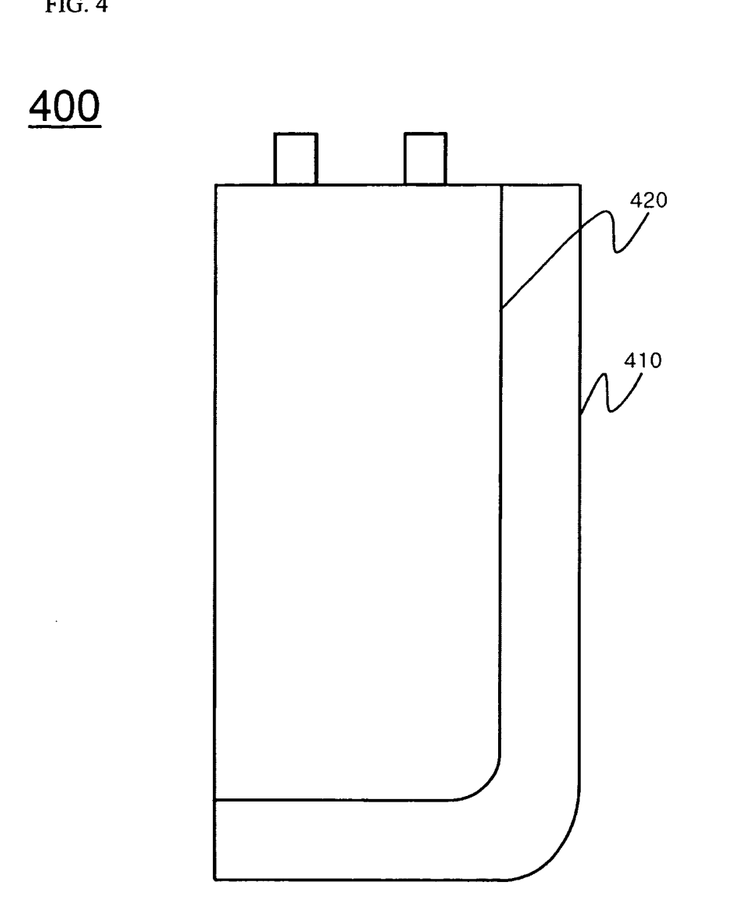
FIG. 4 is a plan view showing an electrode assembly according to another embodiment of the present invention.

FIG. 4 is a plan view typically showing an electrode assembly according to another embodiment of the present invention.

Referring to FIG. 4, an electrode assembly 400 includes a first unit cell 410 and a second unit cell 420. The electrode assembly 400 is identical in construction to the electrode assembly 100 of FIGS. 2 and 3 except that the number of unit cells constituting the electrode assembly 400 is different from that of the unit cells constituting the electrode assembly 100, and therefore, a detailed description thereof will be omitted.

Figure 5:
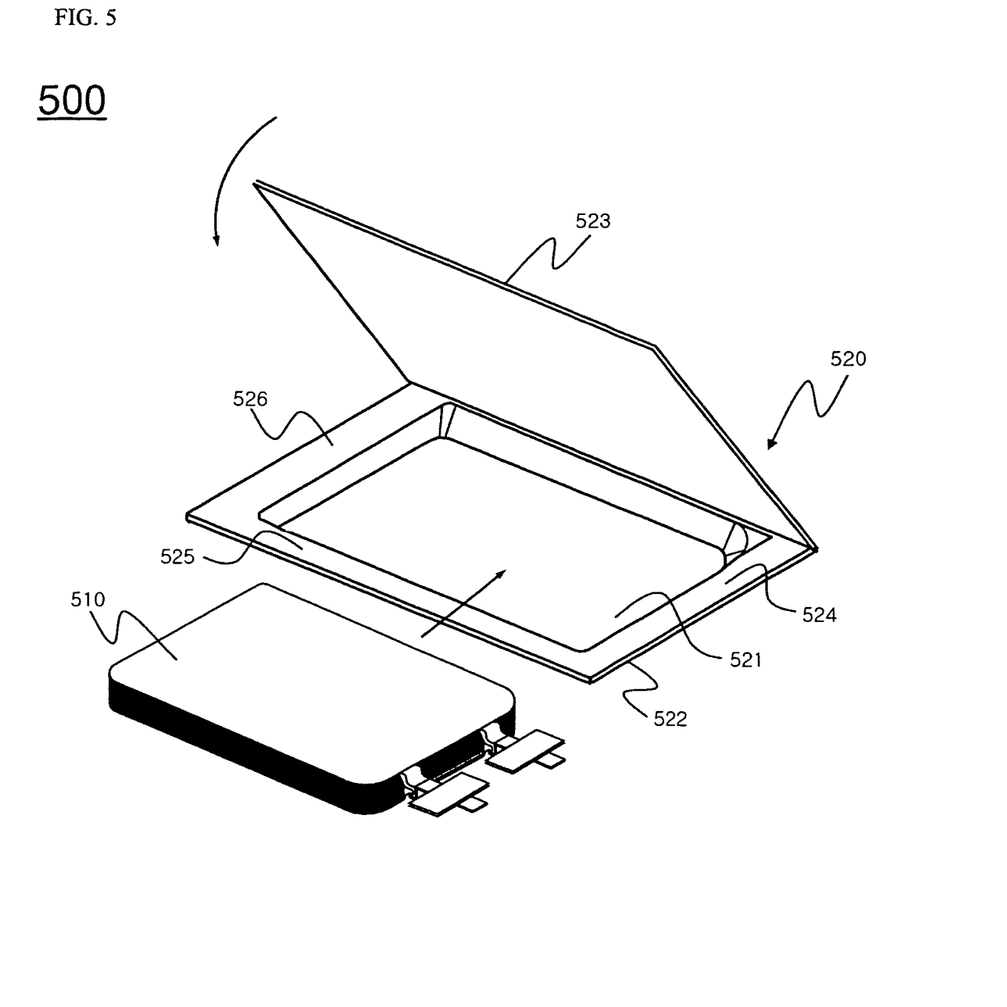
FIG. 5 is an exploded perspective view showing a battery cell according to an embodiment of the present invention.

FIG. 5 is an exploded perspective view typically showing a battery cell according to an embodiment of the present invention.

Referring to FIG. 5, a battery cell 500 includes an electrode assembly 510 and a battery case 520 to receive the electrode assembly in a sealed state. The battery case 510 includes a lower case 522 having a depressed receiving part 521, in which the electrode assembly 510 is located, and an upper case 523 to cover the lower case 522 such that the electrode assembly 510 is sealed in the battery case 510.

The upper case 523 is connected to one side of the lower case 522. The upper case 523 is folded in the lateral direction of the lower case 522 in a state in which the electrode assembly 510 is mounted in the lower case 522 such that the upper case 523 covers the lower case 522. Subsequently, the upper case 523 is coupled to the lower case 522 in a sealed state by thermal welding to form an upper end sealed part 544, a side sealed part 525, and a lower end sealed part 526.

Although corners of the electrode assembly and the battery case are shown as being formed in a quadrangular shape, the electrode assembly shown in FIG. 5 may include a plurality of unit cells having different planar sizes and have a round corner in the same manner as shown in FIGS. 2 and 4. In addition, the battery case may have an internal structure corresponding to the external structure of the electrode assembly.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery cell comprising:
an electrode assembly including:
two or more unit cells, each of which comprises a cathode, an anode, and a separator disposed between the cathode and the anode, electrode tabs protruding from the respective electrodes,
wherein each unit cell has a length along one side thereof in a direction in which the electrode tabs protrude therefrom, and a width along one side thereof in a direction perpendicular to the direction in which the electrode tabs protrude therefrom,
wherein the unit cells are stacked in a height direction on the basis of a plane, at least two of the unit cells having different planer sizes defined at least by different widths,
wherein one or more corners of each of the unit cells, which are not tangent to one side of each of the unit cells at which the electrode tabs are formed, are round, and
wherein the one or more corners of each of the unit cells is defined by a round corner of at least one of the cathode and the anode;
wherein the electrode assembly is mounted in a battery case in a sealed state such that the electrode assembly is impregnated with an electrolyte,
wherein the battery case is formed of a laminate sheet comprising a resin layer and a metal layer or a metal container,
wherein the battery case is provided with a receiving part having an internal structure corresponding to an external structure of the electrode assembly,
wherein a radius of curvature of each of the round corners of the unit cells is equivalent to 5% to 45% the length of each of the unit cells,
wherein the electrode tabs of the unit cells constituting the electrode assembly are coupled to an electrode lead to form an electrode terminal,
wherein a width of the electrode lead is equivalent to 50 to 90% that of each of the electrode tabs, and
wherein, in a case in which the electrode assembly comprises n unit cells, the electrode tabs of an n-th unit cell and the electrode tabs of an (n−1)-th unit cell are formed at the same position despite said unit cells having different widths.

2. The battery cell according to claim 1, wherein, in a case in which the electrode assembly comprises n unit cells, a size of an n-th unit cell located at an uppermost end of the electrode assembly is equivalent to more than 1% and less than 100% that of an (n−1)-th unit cell adjacent to the n-th unit cell.

3. The battery cell according to claim 2, wherein a minimum difference between the width or the length of the n-th unit cell and the width or the length of the (n−1)-th unit cell is 0.5 mm.

4. The battery cell according to claim 3, wherein the minimum difference between the width or the length of the n-th unit cell and the width or the length of the (n−1)-th unit cell is 1 mm.

5. The battery cell according to claim 3, wherein a minimum difference between the width or the length of a first unit cell located at a lowermost end of the electrode assembly and the width or the length of a second unit cell adjacent to the first unit cell is 2 mm.

6. The battery cell according to claim 5, wherein the minimum difference between the width or the length of the first unit cell located at the lowermost end of the electrode assembly and the width or the length of the second unit cell adjacent to the first unit cell is 3 mm.

7. The battery cell according to claim 2, wherein a minimum difference between a radius of curvature of each round corner of the n-th unit cell and a radius of curvature of each round corner of the (n−1)-th unit cell is 0.5 mm.

8. The battery cell according to claim 7, wherein the minimum difference between the radius of curvature of each round corner of the n-th unit cell and the radius of curvature of each round corner of the (n−1)-th unit cell is 1 mm.

9. The battery cell according to claim 7, wherein a minimum difference between a radius of curvature of each round corner of a first unit cell located at a lowermost end of the electrode assembly and a radius of curvature of each round corner of a second unit cell adjacent to the first unit cell is 2 mm.

10. The battery cell according to claim 9, wherein the minimum difference between the radius of curvature of each round corner of the first unit cell located at the lowermost end of the electrode assembly and the radius of curvature of each round corner of the second unit cell adjacent to the first unit cell is 3 mm.

11. The battery cell according to claim 1, wherein, in a case in which the electrode assembly comprises n unit cells, a minimum distance between each of the electrode tabs and a corresponding end of an n-th unit cell located at an uppermost end of the electrode assembly in a lateral direction is 4 mm.

12. The battery cell according to claim 11, wherein, in a case in which the electrode assembly comprises the n unit cells, the minimum distance between each of the electrode tabs and a corresponding end of the n-th unit cell located at the uppermost end of the electrode assembly in the lateral direction is 4.4 mm.

13. The battery cell according to claim 11, wherein the electrode tabs of a first unit cell located at a lowermost end of the electrode assembly to an (n−1)-th unit cell adjacent to the n-th unit cell are formed at the same positions in plane as the electrode tabs of the n-th unit cell.

14. The battery cell according to claim 11, wherein a minimum distance between the cathode tab and the anode tab is 10 mm.

15. A battery pack comprising a battery cell according to claim 1 as a unit battery.

16. A device comprising a battery cell according to claim 1 as a power source.

17. A device comprising a battery pack according to claim 15 as a power source.

* * * * *